Figure 2:
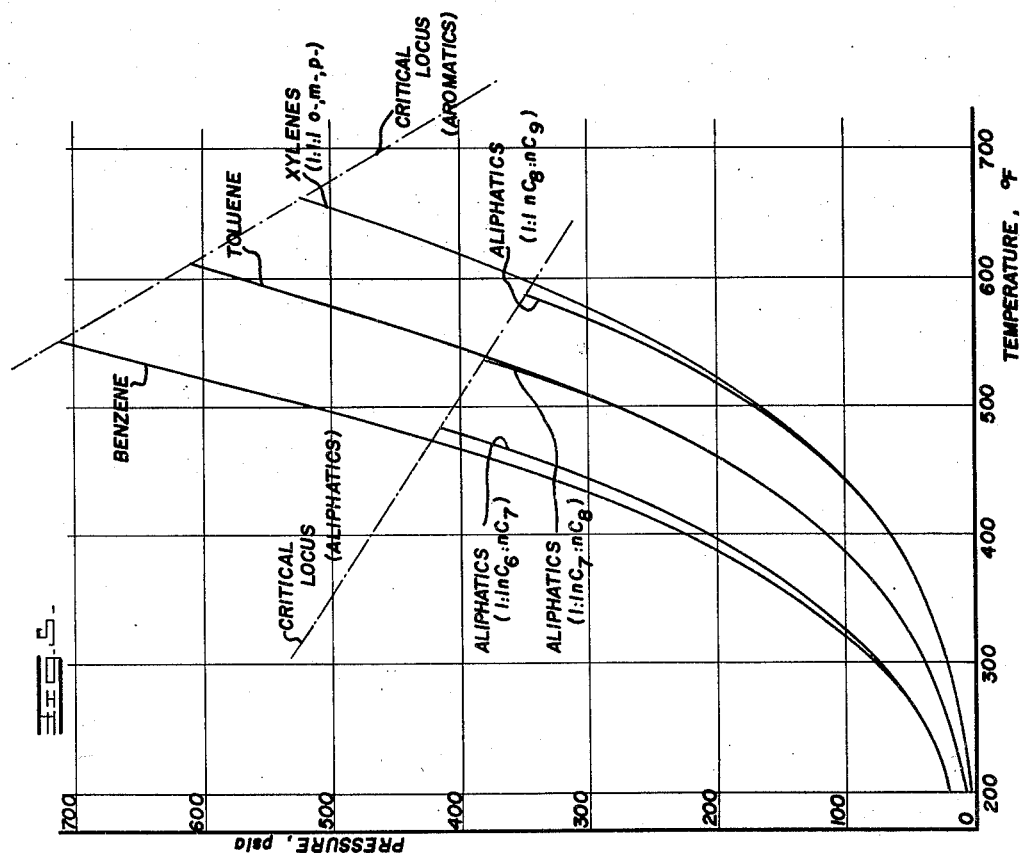

June 22, 1965 L. GARWIN 3,190,934
FRACTIONATION OF HYDROCARBON MIXTURES
Original Filed Aug. 21, 1959 2 Sheets-Sheet 1

INVENTOR.
LEO GARWIN
BY Shanley & O'Neil
ATTORNEYS

June 22, 1965  L. GARWIN  3,190,934

FRACTIONATION OF HYDROCARBON MIXTURES

Original Filed Aug. 21, 1959  2 Sheets-Sheet 2

INVENTOR.
LEO GARWIN

BY Shanley & O'Neil

ATTORNEYS

United States Patent Office 3,190,934
Patented June 22, 1965

3,190,934
FRACTIONATION OF HYDROCARBON MIXTURES
Leo Garwin, Oklahoma City, Okla., assignor to Kerr-McGee Oil Industries, Inc., a corporation of Delaware
Continuation of application Ser. No. 835,265, Aug. 21, 1959. This application Feb. 25, 1963, Ser. No. 278,795
8 Claims. (Cl. 260—674)

This application is a continuation of my copending application Serial No. 835,265, filed August 21, 1959, for "Fractionation of Hydrocarbon Mixtures," now abandoned.

The present invention relates to the fractionation of hydrocarbon mixtures and, in one of its more specific aspects, to a novel process for separating aromatic-aliphatic containing hydrocarbon mixtures into an aromatic-rich fraction and an aromatic-lean fraction.

The separation of hydrocarbon mixtures into aromatic-rich and aromatic-lean fractions by certain prior art extraction processes is well known. For example, the Chlorex, furfural and phenol solvent extraction processing are widely used in the manufacture of lubricating oils which are lean in aromatics. The use of these processes to separate aromatics from light hydrocarbons, e.g., petroleum fractions distilling below 600° F. such as catalytic reformates, has not been widely practiced primarily because the selectivity of the processes is not satisfactory. Also, the recovery of solvent from the extracted aromatic hydrocarbons is very difficult.

In instances where aromatic hydrocarbons such as benzene, toluene and xylene are to be separated from paraffinic materials, a number of commercial processes may be used. Usually an extraction process utilizing di-ethylene glycol as the extractant is preferred over processes including extractive distillation, modified sulfur dioxide extraction, adsorption with silica gel and cyclic adsorption. However, each of these processes has serious disadvantages which render it unattractive from the commercial standpoint. For instance, the extractive distillation process requires an elaborate feed preparation step to obtain a narrow boiling mixture or distillate containing essentially a single aromatic hydrocarbon or very closely related group of aromatic hydrocarbons. The remaining processes also have undesirable features such as high equipment costs, poor solvent selectivity, low solvent power, etc. The silica gel and cyclic adsorption processes are further limited to batch or quasi-batch operation rather than continuous operation.

It is an object of the present invention to provide a novel process for separating aromatic-aliphatic hydrocarbon-containing mixtures into an aromatic-rich fraction and an aromatic-lean fraction which overcomes the above-mentioned disadvantages of the prior art processes.

It is still a further object of the present invention to provide a novel process for separating aromatic-aliphatic containing hydrocarbon mixtures into an aromatic-rich and an aromatic-lean fraction by liquid-liquid solvent extraction wherein the extractant is a bituminous material.

It is still a further object of the present invention to provide a novel continuous process for separating aromatic-aliphatic containing hydrocarbon mixtures into an aromatic-rich fraction and an aromatic-lean fraction by liquid-liquid solvent extraction wherein the extractant is a normally semi-solid or solid bituminous material.

Figure 1:
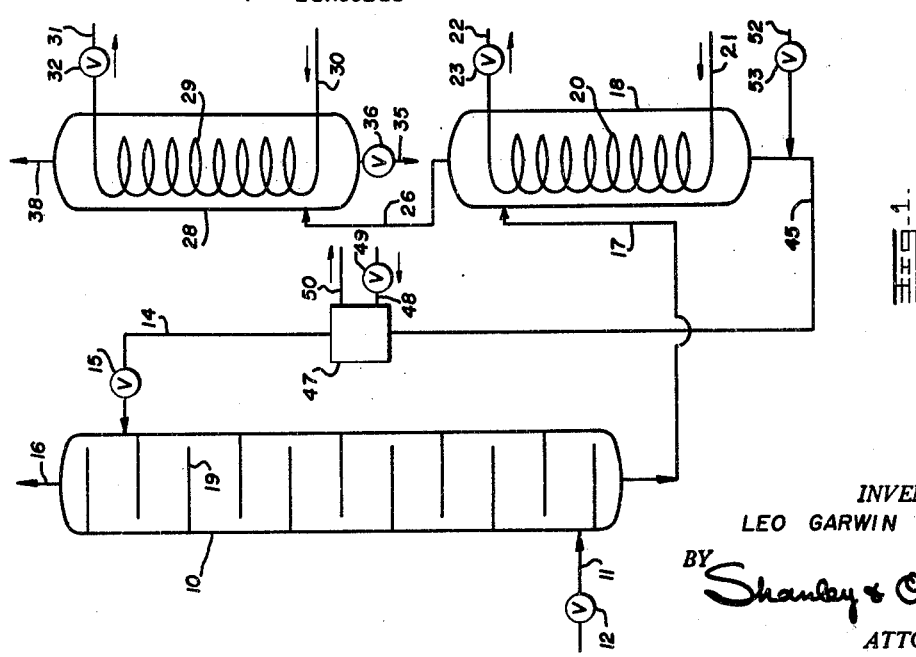
Figure 2:
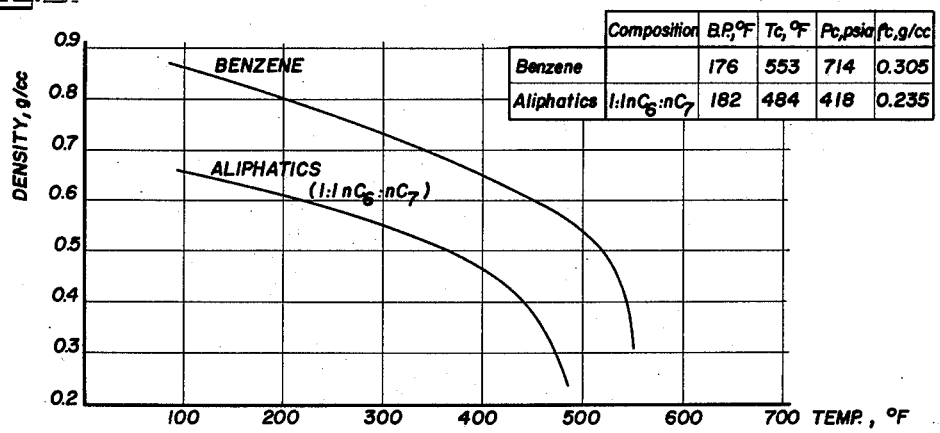
Figure 3:
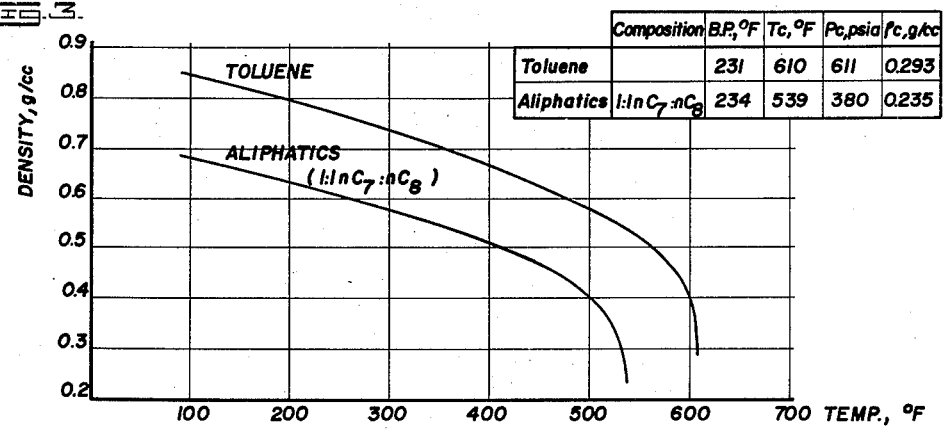
Figure 4:
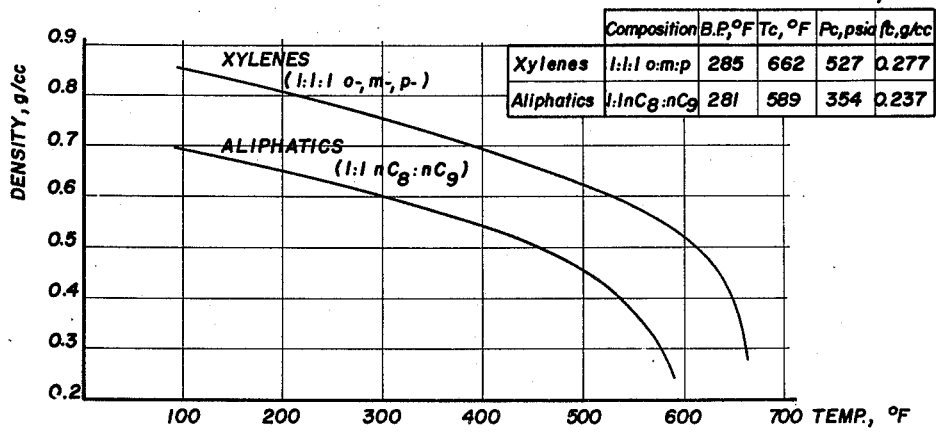

Still other objects and advantages of the present invention will be apparent to those skilled in the art upon reference to the following detailed description, the specific examples and the drawings, wherein:

FIGURE 1 diagrammatically illustrates one suitable arrangement of apparatus for practicing the present invention;

FIGURE 2 graphically illustrates the manner in which the density of benzene and an aliphatic hydrocarbon mixture containing approximately equal volumes of n-hexane and n-heptane varies with temperature;

FIGURE 3 graphically illustrates the manner in which the density of toluene and an aliphatic hydrocarbon mixture containing approximately equal volumes of n-heptane and n-octane varies with temperature;

FIGURE 4 graphically illustrates the manner in which the density of a mixture of xylenes containing equal volumes of o-, m- and p-xylene and an aliphatic hydrocarbon mixture containing approximately equal volumes of n-octane and n-nonane varies with temperature; and FIGURE 5 graphically illustrates the manner in which the saturation pressures of the various hydrocarbons and hydrocarbon mixtures of FIGURES 2, 3 and 4 vary with temperature.

In accordance with one important embodiment of the present invention, a hydrocarbon mixture containing aromatic and aliphatic hydrocarbons is contacted with a bituminous material extractant under elevated temperature and pressure conditions. The temperature should be at least as high as 60° F. below the critical for the average aliphatic hydrocarbon component contained in the hydrocarbon mixture and the pressure should be adjusted to provide a density not more than about 0.4 g./cc. for the aliphatic hydrocarbon component. Under such temperature and pressure conditions, it has been discovered that phase separation occurs between a heavy aromatic-rich phase including bituminous material extractant and a lighter aromatic-lean phase. The resulting phases may be separated to obtain an aromatic-rich fraction and an aromatic-lean fraction.

Referring now to FIGURE 1 of the drawings, a hydrocarbon mixture containing aliphatic and aromatic hydrocarbons may be fed continuously to a lower portion of column 10 via conduit 11 at a rate controlled by valve 12. Simultaneously, a fluid bituminous material extractant for the aromatic hydrocarbon content of the mixture may be fed continuously to an upper portion of column 10 via conduit 14 at a rate controlled by valve 15. Preferably, not more than about 0.5 volume of bituminous material extractant is contacted with each volume of the hydrocarbon mixture. The bituminous material extractant may be passed into column 10 at a point near the top and flows downward in intimate contact with the rising hydrocarbon mixture fed via conduit 11. If desired, column 10 may be provided with conventional contacting means for assuring intimate contact between the hydrocarbon mixture and extractant such as trays 19. A liquid phase lighter fraction lean in aromatic hydrocarbons is withdrawn from the top of column 10 via conduit 16, while a heavier liquid phase fraction containing bituminous material extractant now rich in extracted aromatic hydrocarbons, is withdrawn via conduit 17 and passed to vessel 18.

The vessel 18 may be heated by means of a hot fluid such as superheated steam supplied to coil 20 via conduit 21 and withdrawn therefrom via conduit 22 at a rate controlled by valve 23. The contents of vessel 18 are heated to a temperature sufficiently high to vaporize the extracted aromatic hydrocarbon component of the hydrocarbon mixture. Also the temperature is sufficiently high to maintain the bituminous material extractant in the liquid phase in instances where it is normally semi-solid to solid at room temperature. Hydrocarbon vapor rich in aromatic hydrocarbons is withdrawn from vessel 18 via conduit 26 and passed to condenser 28. While within condenser 28, the hydrocarbon vapor is condensed by means of a coolant supplied to cooling coil 29 via conduit 30 and withdrawn therefrom via conduit 31 at a rate controlled by valve 32. The resulting liquid hydrocarbon fraction rich in aromatic hydrocarbons may be withdrawn from condenser 28 via conduit 35 at a rate controlled by valve 36, while non-condensible gases, when present, may be withdrawn from the top of condenser 28 via conduit 38.

Fluid bituminous material extractant may be withdrawn from the bottom of vessel 18 via conduit 45 and passed to heat exchanger 47 where the temperature is adjusted to a desired level for feeding to column 10 via conduit 14. This may be accomplished by feeding a heated or cooled fluid, as necessary, to heat exchanger 47 via conduit 48 at a rate controlled by valve 49, and withdrawing the same via conduit 50. Fresh bituminous material extractant may be supplied to conduit 45 via conduit 52 at a rate controlled by valve 53 at the time of commencing operations or in other instances where this is necessary.

The pressure required to provide a given desired density value for aliphatic paraffins may be readily obtained from literature on the subject such as the chart on page 134 of the Engineering Data Book published in 1957 by the Natural Gasoline Supply Men's Association, Tulsa, Oklahoma. In addition, density data for benzene and a mixture of aliphatic hydrocarbons containing approximately equal volumes of normal hexane and normal heptane may be obtained upon reference to FIG. 2; toluene and a mixture of aliphatic hydrocarbons containing approximately equal volumes of normal heptane and normal octane may be obtained upon reference to FIGURE 3; and xylenes and a mixture of aliphatic hydrocarbons containing approximately equal volumes of normal octane and normal nonane may be obtained upon reference to FIGURE 4. Upon reference to FIGURE 5, it is possible to obtain the saturation pressure in pounds per squre inch absolute for various temperatures for each of the solvent combinations of FIGURES 2, 3 and 4, above discussed. Thus, upon reference to FIGURES 2, 3, 4 and 5, it is possible to select suitable conditions of operation for column 10 which will be satisfactory for operation with the hydrocarbon mixtures given therein. If it is desired to separate other mixtures of hydrocarbons, then reference texts are readily available to provide data.

The average molecular weight of hydrocarbon mixtures may be determined by several well known methods but the ASTM 50% point on distillation is the preferred method. The critical temperature for the average aliphatic hydrocarbon component of a hydrocarbon mixture is intended to correspond to a theoretical aliphatic hydrocarbon possessing the average molecular weight of the aliphatic hydrocarbon components present. The manner in which this value is calculated is likewise well known in the petroleum art.

The bituminous material extractants useful in practicing the present invention are materials such as asphalts, components of asphalts, e.g., asphaltenes, resins and asphaltic oils, gilsonite and other native asphalts, coal tar derived oils and resins, tall oil resins, and higher homologues and derivatives of benzene, naphthalene, anthracene, etc., which have chemical and physical properties as hereinafter discussed. In general, the extracants should have a melting or softening point of about 150° F. or higher, a molecular weight of at least about 350, and are further characterized by an ability to dissolve no more than about one volume of aliphatic hydrocarbon for each volume of the extractant when the aliphatic hydrocarbon has a density value of about 0.23-0.40 g./cc., i.e., under the temperature and pressure conditions maintained within column 10. Although the preferred extractants usually have softening points higher than 150° F., asphaltic oils which are liquid to semi-solid at room temperature, depending somewhat upon the pour point of the oil, may be employed. However, because of their lower molecular weight, the asphaltic oils tend to have a higher solvent capacity for the aliphatic hydrocarbons or paraffins than do the higher molecular weight, normally solid bituminous material extractants. Thus, asphaltic oils are not as satisfactory for use as extractants as the higher molecular weight asphaltenes or petroleum resins. The preferred petroleum resins and/or asphaltenes useful as extractants in accordance with the present invention may be derived from asphalt and related materials by treatment with various hydrocarbon solvents in accordance with the teachings of my copending application Serial No. 631,351, filed December 28, 1956, now abandoned.

The mixture of aromatic and aliphatic hydrocarbons to be fractionated in accordance with the teachings of the present invention may be obtained from numerous sources such as crude oil distillates, reforming operations, or destructive distillation and retorting processes. Distillate fractions obtained from catalytic reforming are especially desirable since they are relatively rich in aromatic hydrocarbons such as benzene, toluene, xylene, ethyl benzene and similar homologues having less than about 10 carbon atoms. Straight run naphthas as well as catalytic naphthas may be used as charge stocks. It is usually preferred that catalytic reformate be separated into 50° F. or 100° F. fractions boiling over the approximate temperature range 150 to 600° F. The resulting distillates may be separately treated to obtain aromatic-rich fractions having boiling ranges, for example, of 150–200° F., 200–300° F., etc., and this is of advantage in many instances. Preferred hydrocarbon mixtures have boiling points less than 600° F. The process of the present invention is especially well adapted for treating mixtures of hydrocarbons containing less than about 10 carbon atoms per molecule and/or hydrocarbon mixtures having boiling points less than about 375° F.

The foregoing detailed description and the following specific examples are for purposes of illustration only and are not limiting to the spirit or scope of the appended claims.

*Example I*

This example illustrates the preferred continuous process of the present invention. However, a batch process may be used in instances where this is desirable.

A light hydrocarbon mixture obtained from petroleum and containing by volume 50% benzene, 25% hexane and 25% heptane was fed to column 10 via conduit 11. Simultaneously, about 0.4 volume of hot, fluid petroleum resin for each volume of the hydrocarbon mixture was fed to the upper portion of column 10 via conduit 14. The petroleum resin was passed downward through the column and countercurrently contacted with the rising hydrocarbon mixture. The temperature within column 10 was controlled at about 475° F. by varying the temperatures at which the resin and hydrocarbon mixtures were charged to the system, but other suitable means such as a heating coil may be used where this is desirable.

The pressure maintained within treating tower 10 was adjusted to about 380 p.s.i.a. to provide a density for the average aliphatic component of about 0.3 g./cc. Under these conditions, the benzene component normally has a density in excess of 0.5 g./cc. Aromatic hydrocarbons have relatively high solubilities in petroleum resins or other bituminous material extractants at the density levels prevailing in column 10 and aliphatics have relatively poor solubilities. Therefore, the heavy phase withdrawn from the bottom of column 10 via conduit 17 was relatively rich in benzene and the lighter phase withdrawn from the top of column 10 via conduit 16 was relatively lean in benzene. The heavy phase was passed to vessel 18 where hydrocarbon vapors rich in benzene were removed by distillation and passed to condenser 28 for recovery of a benzene-rich liquid hydrocarbon fraction.

Petroleum resins, heated sufficiently to be fluid and readily flowable, were withdrawn from vessel 18 and passed to heat exchanger 47 where the temperature was adjusted to provide an operating temperature of 475° F. in column 10. Then, the hot petroleum resins were recycled via conduit 14 to treating vessel 10.

Example II

This example illustrates the use of asphaltenes as an extractant for aromatic hydrocarbons.

One volume of hot, fluid asphaltenes were charged to column 10 via conduit 14 while 4 volumes of a hydrocarbon mixture containing, by volume, 25% heptane, 25% octane and 50% toluene was fed via conduit 11. The fluid asphaltenes were contacted with the hydrocarbon mixture at about 490–540° F., i.e., at a temperature level within the paracritical range for the aliphatic component and above the softening point of the asphaltenes, to thereby maintain liquid phase conditions throughout column 10. The pressure was adjusted to provide a density of 0.3–0.4 g./cc. or lower for the average aliphatic component. Under the above temperature and pressure conditions, the density of the aromatic component was about 0.5–0.6 gram per cc. Under the temperature and pressure conditions prevailing in column 10, the asphaltenes were miscible with the aromatic components of the hydrocarbon mixture but the aliphatic components had only a limited solubility in the asphaltenes and consequently separated as a second lighter phase. This lighter phase was passed from the top of the column via conduit 16 as an aromatic-lean fraction.

A heavy asphaltene phase rich in aromatics was withdrawn continuously from the bottom of column 10 via conduit 17 and an aromatic-rich fraction recovered as discussed in Example I.

Example III

This example illustrates the use of asphalt as an extractant in the present invention.

A hydrocarbon mixture containing xylenes, nonane and octane and boiling around 350° F. was charged continuously to column 10 via conduct 11 and contacted with 0.5 volume of a propane asphalt having a ring and ball softening point of 185° F. which was supplied to column 10 via conduit 14. The asphalt entered the column in the fluid phase and was intimately contacted with the rising hydrocarbon mixture as the asphalt moved downward through the column. The temperature within column 10 was maintained within about 60° F. of the critical temperature of the average aliphatic component, i.e., about 540–590° F. The pressure within column 10 was adjusted to obtain a density for the nonane-octane mixture at this temperature of about 0.3–0.4 g./cc. Under these temperature and pressure conditions, xylenes have density values of about 0.5–0.6 g./cc. and are soluble in asphalt. The aliphatic component of the hydrocarbon mixture feed, however, exhibited only limited solubility in the asphalt. Consequently, the lighter fraction passing overhead from column 10 via conduit 16 was lean in aromatics and the heavy asphalt phase withdrawn via conduit 17 was rich in extracted aromatics. The asphalt and its aromatic hydrocarbon content, together with a small amount of the aliphatic hydrocarbons, was passed via conduit 17 to vessel 18 and the light hydrocarbon content removed therefrom and the asphalt recycled in the system as discussed in Example I.

Instead of using a propane asphalt as the extractant, gilsonite and tall oil pitch resins having softening points in the vicinity of 185° F. were used as described above. These materials were found to be very effective as extractants for aromatic hydrocarbons under the temperature and pressure conditions existing in column 10.

What is claimed is:

1. A process for separating a hydrocarbon mixture containing essentially of aromatic and aliphatic hydrocarbons having 6 through 9 carbon atoms into aromatic-rich and aromatic-lean fractions comprising the steps of intemiately contacting the hydrocarbon mixture with an extractant consisting of bituminous material under elevated temperature and pressure conditions, the bituminous material extractant having a molecular weight of at least about 350 and an ability to dissolve no more than about one volume of the aliphatic hydrocarbon for each volume of the bituminous material extractant under the elevated temperature and pressure conditions, the extractant having a higher molecular weight than an aromatic hydrocarbon contained in the hydrocarbon mixture, the temperature being at least as high as 60° F. below the critical for the average aliphatic hydrocarbon component of the hydrocarbon mixture, the temperature and pressure being adjusted to provide a density of not more than about 0.4 g./cc. for the aliphatic hydrocarbon component of the hydrocarbon mixture to thereby effect phase separation between an aromatic-rich phase including the bituminous material extractant and an aromatic-lean phase, and separating the resulting phases to obtain an aromatic-rich fraction and an aromatic-lean fraction.

2. The process of claim 1 wherein the temperature of separation is at least about 350° F. and the temperature and pressure are adjusted to provide a density of about 0.23–0.4 g./cc. for the alphatic hydrocarbon component of the hydrocarbon mixture.

3. A process for separateing a hydrocarbon mixture consisting essentially of aromatic and alphatic hydrocarbons having 6 through 9 carbon atoms into aromatic-rich and aromatic-lean fractions comprising the steps of intimately contacting each volume of the hydrocarbon mixture with not more than 0.5 volume of an extractant consisting of bituminous material under elevated temperature and pressure conditions, the bituminous material extractant having a molecular weight of at least about 350 and an ability to dissolve no more than about one volume of the aliphatic hydrocarbon for each volume of the bituminous material extractant under the elevated temperature and pressure conditions, the extractant having a higher molecular weight than an aromatic hydrocarbon contained in the hydrocarbon mixture, the temperature being at least as high as 60° F. below the critical for the average aliphatic hydrocarbon component of the hydrocarbon mixture, the temperature and pressure being adjusted to provide a density of not more than about 0.4 g./cc. for the aliphatic hydrocarbon component of the hydrocarbon mixture to thereby effect phase separation between an aromatic-rich phase including the bituminous material extractant and an aromatic-lean phase, and separating the resulting phases to obtain an aromatic-rich fraction and an aromatic-lean fraction.

4. The process of claim 3 wherein the temperature of separation is at least about 350° F. and the temperature and pressure are adjusted to provide a density of about 0.23–0.4 g./cc. for the aliphatic hydrocarbon component of the hydrocarbon mixture.

5. A process for separating a hydrocarbon mixture consisting essentially of aromatic and aliphatic hydrocarbons having 6 through 9 carbon atoms into aromatic-rich and aromatic-lean fractions comprising the steps of intimately contacting the hydrocarbon mixture with an extractant consisting of bituminous material selected from the group consisting of asphalt, asphaltenes and asphaltic resins under elevated temperature and pressure conditions, the extractant having a higher molecular weight than an aromatic hydrocarbon contained in the hydrocarbon mixture, the temperature being at least as high as 60° F. below the critical for the average aliphatic hydrocarbon component of the hydrocarbon mixture, the temperature and pressure being adjusted to provide a density of not more than about 0.4 g./cc. for the aliphatic hydrocarbon component of the hydrocarbon mixture to thereby effect phase separation between an aromatic-rich phase including the bituminous material extractant and an aromatic-lean phase, and separating the resulting phases to obtain an aromatic-rich fraction and an aromatic-lean fraction.

6. The process of claim 5 wherein the temperature of separation is at least about 350° F. and the temperature and pressure are adjusted to provide about 0.23–0.4 g./cc. for the aliphatic hydrocarbon component of the hydrocarbon mixture.

7. A process for separating a hydrocarbon mixture consisting essentially of aromatic and aliphatic hydrocarbons having 6 through 9 carbon atoms into aromatic-rich and aromatic-lean fractions comprising the steps of intimately contacting each volume of the hydrocarbon mixture with not more than 0.5 volume of an extractant consisting of bituminous material selected from the group consisting of asphalt, asphaltenes and asphaltic resins under elevated temperature and pressure conditions, the extractant having a higher molecular weight than an aromatic hydrocarbon contained in the hydrocarbon mixture, the temperature being at least as high as 60° F. below the critical for the average aliphatic hydrocarbon component of the hydrocarbon mixture, the temperature and pressure being adjusted to provide a density of not more than about 0.4 g./cc. for the aliphatic hydrocarbon component of the hydrocarbon mixture to thereby effect phase separation between an aromatic-rich phase including the bituminous material extractant and an aromatic-lean phase, and separating the resulting phases to obtain an aromatic-rich fraction and an aromatic-lean fraction.

8. The process of claim 7 wherein the temperature of separation is at least about 350° F. and the temperature and pressure are adjusted to provide a density of about 0.23–0.4 g./cc. for the aliphatic hydrocarbon component of the hydrocarbon mixture.

References Cited by the Examiner
UNITED STATES PATENTS
2,937,135   5/60   Middleton _____ 208—96

ALPHONSO D. SULLIVAN, *Primary Examiner.*